March 27, 1956 — O. W. HOLDEN — 2,739,711
SCREEN AND HOLDER FOR AERATING DEVICE
Filed Nov. 1, 1952
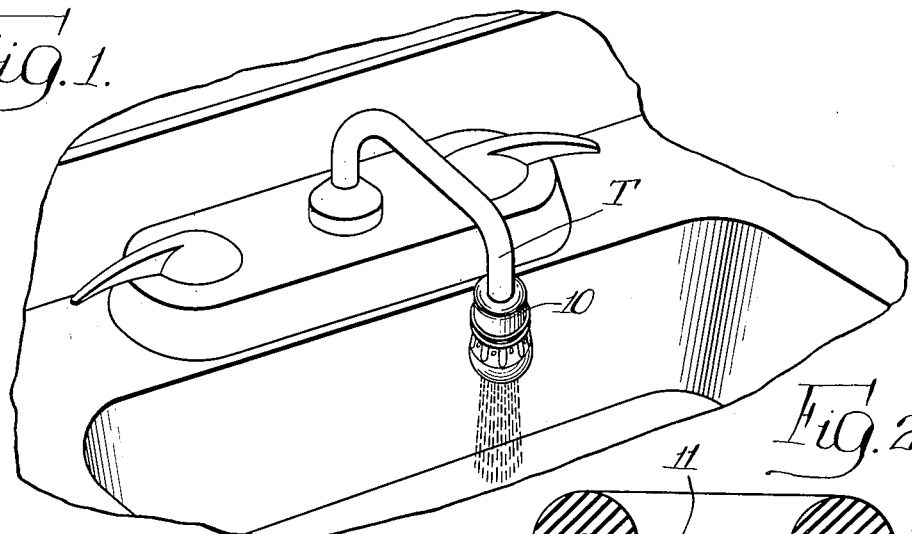
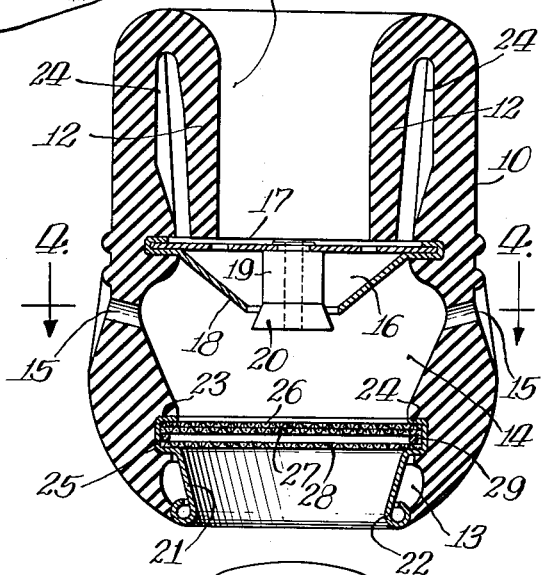
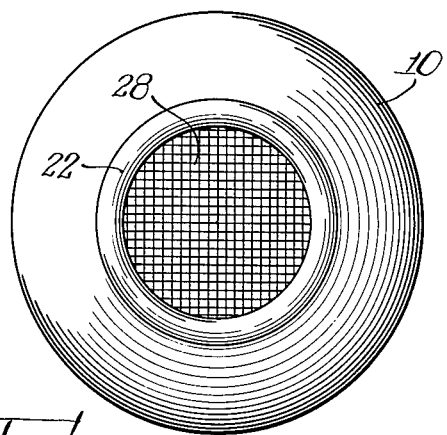
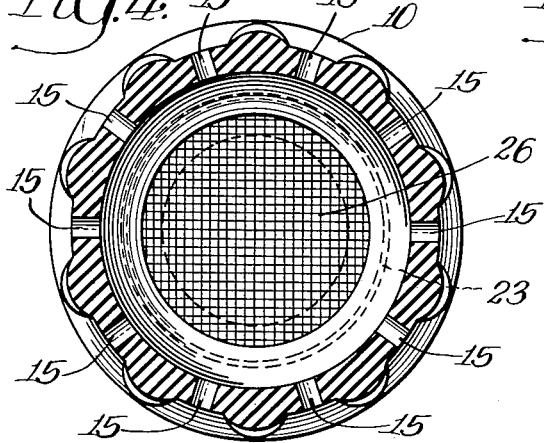
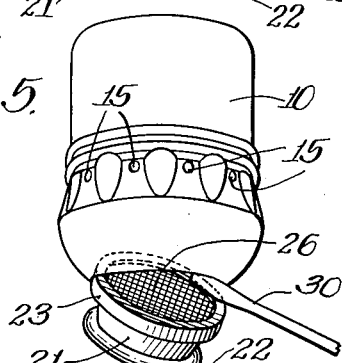
INVENTOR.
Orloff W. Holden;
BY Foorman L. Mueller
Atty.

United States Patent Office 2,739,711
Patented Mar. 27, 1956

2,739,711

SCREEN AND HOLDER FOR AERATING DEVICE

Orloff W. Holden, Chicago, Ill., assignor to Orloff W. Holden and Marguerite H. Holden, a partnership doing business as Knickerbocker Rubber Company, not Inc., Chicago, Ill.

Application November 1, 1952, Serial No. 318,263

4 Claims. (Cl. 210—84)

This invention relates to devices for aerating liquids under pressure, and more particularly to aerating devices of the type adapted to be supported by a water faucet to transform the stream of water from the faucet into a soft coherent stream that is not subject to splashing when it impinges upon hard objects.

Aerating devices of the type mentioned above are known, but for the most part are subject to being clogged by foreign material suspended in the fluid to be aerated and are usually constructed in such a manner as to render it difficult if not impossible to remove the clogged portions of the aerator for flushing and cleaning purposes.

It is, accordingly, an object of the present invention to provide an improved aerating device which is constructed so that parts thereof which are subject to clogging by foreign material suspended in the fluid to be aerated may be quickly and conveniently removed for cleaning purposes.

A further object of the invention is to provide such an improved aerating device in which the portions subject to clogging may be removed in a simple and expedient manner without the necessity of disassembling the device.

A feature of the invention is the provision of an aerating device having a unitary resilient casing with a nipple removably mounted in the outlet portion thereof, the nipple having the diffusing means of the aerator which is subject to clogging supported thereby and extending across the aerator, which diffusing means may be cleaned from time to time simply by removing the nipple.

Other objects and features and the attending advantages of the invention may best be understood by reference to the following description when taken in conjunction with the accompanying drawing in which:

Fig. 1 shows the aerating device of this invention mounted upon a well known water faucet, Fig. 2 is a sectional view of the aerating device of the invention, Fig. 3 is a bottom view of the device, Fig. 4 is a sectional view taken along the lines 4—4 of Fig. 2, and Fig. 5 shows how the outlet nipple of the aerator which contains the diffusion means may be removed for cleaning purposes.

In practicing the invention there is provided a one-piece cylindrical casing made of resilient material such as rubber. The casing has an inlet at one end adapted to be connected to a water faucet or the like and a spray forming means supported within the casing for breaking up the stream of water into fine particles. The resilient casing also has an outlet end in which a nipple is removably supported, the nipple having a diffuser means supported therein and extending thereacross. The spray forming means and the diffuser means define a mixing chamber within the casing, and the casing has apertures extending therethrough for the entry of air into the chamber. In such a construction the diffuser means may become clogged by foreign material in the water, and in accordance with the invention this structure is removable for cleaning when such clogging occurs.

Referring now to Figs. 1–5 of the drawing, there is shown one embodiment of the invention comprising a unitary casing 10 of resilient material which is generally cylindrical in form. The embodiment of the aerator device disclosed is generally similar to that disclosed and claimed in copending application Serial No. 318,182, filed November 1, 1952, in the name of Lee and Gerberick and assigned to the present assignee. Casing 10 has at one end an inlet portion 11 defined by a re-entrant portion 12 which may be slipped over the end of a water faucet to secure the casing 10 thereon. In Fig. 1, the device is shown applied to a faucet T. The casing may be composed of rubber or similar resilient material, and the inturned or re-entrant portion 12 may be of reduced thickness to increase the flexibility and resilience thereof. A series of vertical, integral stiffening ribs 24 are formed on the inner surface of casing 10 facing the inturned portion 12 to provide that portion with extra force to grip the faucet. At the end of casing 10 opposite the inlet portion 11 is an outlet portion 13, and between the inlet and outlet a mixing or aerating chamber 14 is formed in the casing. A plurality of apertures 15 are provided in the casing leading into the mixing chamber 14 for the entry of air into the chamber. The air and liquid are mixed in chamber 14 through the operation of components of the device which are to be described in detail hereinafter.

Disposed in casing 10 between inlet portion 11 and chamber 14 is a spray forming structure 16 which includes an apertured orifice disc 17 extending across casing 10 about $\frac{1}{32}''$ from the bottom of inturned portion 12 and inserted into a groove in the casing. The spray forming structure also includes a hollow open-ended frusto-conical shaped splash member 18 supported below disc 17 in coaxial relation with the longitudinal axis of the casing and with its large end facing and secured to the disc by turning a peripheral flange associated therewith over the edge of the disc, and its small end facing outlet 13. The nozzle also includes a cylindrical center pin 19 supported in coaxial relation with the longitudinal axis of casing 10 within conical member 18 and having one end secured to disc 17, and having a flared end 20 extending through the small end of cone 18.

The aerating device includes a nipple 21 removably supported in its outlet portion 13. Nipple 21 has converging outlet 22 with a rolled-over annular portion at its outer end coacting with the rim of the outlet portion 13, and has an annular portion 23 at its inner end which extends radially outwardly and into an annular groove 24 formed in casing 10 adjacent outlet portion 13. The annular portion 23 of nipple 21 defines an internal annular channel 25, and one or more diffuser screens 26, 27, and 28 are supported within the annular channel and extend across the nipple. The diffuser screens may comprise, for example, a plurality of discs of metal screen or other suitable material which overlie each other and have their edges secured together by any suitable means and rigidly held within channel 25. It has been found that highly satisfactory results may be achieved by the use of three such screens of 30–30 mesh made from .012 inch woven wire, with two of the screens placed in direct engagement, and the third screen separated from the two by a wire ring 29. It is to be pointed out that a different number of screens or rings may be desirable in certain applications. The provision of nipple 21 with a converging outlet 22, as illustrated, has been found to improve greatly the coherence and smoothness of the stream emerging from outlet 13.

When the device of the invention is placed in operation, water or other fluid under pressure passes through inlet portion 11 and through the apertures in disc 17. The resulting jets acquire high velocity due to the conversion of the pressure energy to velocity energy and are directed against the inner surface of conical splash member 18 which directs the same against the pin 19 and breaks the water into droplets which are discharged through the annular opening between center pin 19 and the cone as a fine spray of hollow conical shape. The resulting spray is directed to the diffuser screens 26, 27 and 28. The spray draws air in through apertures 15 in accordance with well known Venturi principles and, as the spray of water droplets discharging from the spray cone hits the wire screens, air bubbles are entrained and thoroughly mixed with the fluid so that a soft aerated stream of water emerges from outlet 13, which does not splash upon impingement on hard surfaces.

As previously noted, the diffuser screens 26, 27 and 28 are subject to being clogged by foreign matter suspended within the fluid aerated by the device and, in accordance with the invention, the device is constructed so that the screens may be removed from time to time for cleaning purposes. This is accomplished by supporting the screens in the nipple 21 in the previously described manner, and by removably supporting the nipple in the annular channel 24 in the resilient casing, with the outlet 22 extending at the end of the aerator. As shown in Fig. 5, the nipple may be conveniently removed by means of a small screw driver 30 or other appropriate tool. The small screw driver is inserted between the rubber casing and the metal nipple and worked gently upwardly to catch the top edge of the nipple which is then pried out of casing 10 by means of a slight lever action. The diffuser screens may then be cleansed by holding the nipple upside down under a hot water faucet, for example, to flush out the foreign material. The nipple may then be reinserted by tilting it sideways and forcing its large end upward back into the annular channel 24 of casing 10. The provision of an outlet extending to the end of the casing facilitates removal and replacement of the nipple.

The invention provides, therefore, an improved aerating device which is constructed in such a manner that the diffuser screens thereof which are subject to clogging by foreign material suspended in the fluid to be aerated by the device may be removed in an extremely simple and expedient fashion from time to time so that such foreign material may be flushed from the screens enabling the aerating device to perform its functions unimpaired.

While a particular embodiment of the invention has been shown and described, modifications may be made and it is intended in the appended claims to cover all such modifications as fall within the true spirit and scope of the invention.

I claim:

1. A device for passing liquid through a screen, which liquid may have foreign particles therein tending to clog the screen, said device including a cylindrical housing of resilient material having inlet and outlet portions, said inlet portion being adapted to receive a stream of liquid, and a tubular outlet nipple structure having an inner screen supporting portion and a tubular converging portion extending from said screen supporting portion, said structure including at least one screen secured to said screen supporting portion, said nipple structure being adapted to be removably supported within said outlet portion of said cylindrical housing, said outlet portion of said housing having an inturned outer end adapted to engage the outer end of said tubular converging portion of said nipple structure, said nipple structure and said outlet portion having interengaging parts for retaining said nipple structure within said housing, with said resilient housing being deformable to permit removal of said nipple structure therefrom for cleaning of said screen, and said converging portion of said nipple structure facilitating such removal.

2. A device for passing liquid through a screen, which liquid may have foreign particles therein tending to clog the screen, said device including a cylindrical housing of resilient material having inlet and outlet portions, said inlet portion being adapted to receive a stream of liquid, said outlet portion having an internal annular groove therein spaced from the outlet end thereof, and a tubular outlet nipple structure having an annular projecting portion at its inner end defining an internal annular channel, a tubular converging portion extending from said projecting portion, and a rolled-over end portion at the outer end of said nipple structure, said nipple structure including at least one screen having the edge thereof supported in said internal annular channel and extending across said nipple structure, said nipple structure being adapted to be removably supported within said outlet portion of said cylindrical housing with said projecting portion thereof supported in said internal annular groove, said outlet end of said outlet portion of said outlet housing being of such configuration to engage said rolled-over end portion of said nipple structure, said resilient housing being deformable to permit removal of said nipple structure therefrom for cleaning of said screen, and said converging portion of said nipple structure facilitating such removal.

3. In a device for aerating a liquid under pressure, and which device includes means for forming a spray, means for mixing the spray with air and a screen through which the aerated liquid passes with the liquid being subject to having foreign particles therein which tend to clog the screen, the combination including a cylindrical housing formed of resilient material and having inlet and outlet portions, said inlet portion being adapted to receive a stream of liquid, said outlet portion having an internal annular groove therein spaced from the outlet end thereof, and a tubular outlet nipple structure having an annular projecting portion at its inner end, a tubular converging portion extending from said projecting portion, and a rolled-over end portion at the outer end of said nipple structure, said nipple structure including at least one screen having the edge thereof supported by said annular projecting portion and extending across said nipple structure, said nipple structure being adapted to be removably supported within said outlet portion of said cylindrical housing with said projecting portion thereof supported in said internal annular groove with said rolled-over portion at said outlet end of said housing, said resilient housing being deformable to permit removal of said nipple structure therefrom to permit cleaning of said screen, and said converging portion of said nipple structure facilitating such removal.

4. A device for passing liquid through a screen, which liquid may have foreign particles therein tending to clog the screen, said device including a cylindrical housing of resilient material having inlet and outlet portions, said inlet portion being adapted to receive a stream of liquid, and a tubular outlet nipple structure having a screen supporting portion and a tubular portion extending from said screen supporting portion, said tubular portion providing a passage which converges from said screen supporting portion to the outer end of said tubular portion, said nipple structure including at least one screen secured to said screen supporting portion, said nipple structure being adapted to be removably supported within said outlet portion of said cylindrical housing, said outlet portion of said housing having an outer end adapted to engage the said outer end of said tubular portion of said nipple structure, said nipple structure and said outlet portion having interengaging parts for retaining said nipple structure within said housing, with said resilient housing being deformable to permit removal of said nipple structure therefrom for cleaning of said screen, and said tubular portion of said nipple structure facilitating such removal.

References Cited in the file of this patent

UNITED STATES PATENTS

| | | |
|---|---|---|
| 711,535 | Scholl | Oct. 21, 1902 |
| 981,702 | Smith | Jan. 17, 1911 |
| 1,508,265 | Bailey | Sept. 9, 1924 |
| 2,100,165 | Holmberg et al. | Nov. 23, 1937 |
| 2,633,343 | Aghnides | Mar. 31, 1953 |
| 2,664,278 | Aghnides | Dec. 29, 1953 |